(12) United States Patent
Karame (10) Patent No.: US 10,785,033 B2
(45) Date of Patent: Sep. 22, 2020

(54) METHOD FOR STORING AN OBJECT ON A PLURALITY OF STORAGE NODES

(71) Applicant: NEC Laboratories Europe GmbH, Heidelberg (DE)

(72) Inventor: Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 136 days.

(21) Appl. No.: 15/756,599

(22) PCT Filed: Sep. 4, 2015

(86) PCT No.: PCT/EP2015/070206
§ 371 (c)(1),
(2) Date: Mar. 1, 2018

(87) PCT Pub. No.: WO2017/036546
PCT Pub. Date: Mar. 9, 2017

(65) Prior Publication Data
US 2018/0191502 A1    Jul. 5, 2018

(51) Int. Cl.
*G06F 7/04* (2006.01)
*G06F 7/16* (2006.01)
(Continued)

(52) U.S. Cl.
CPC ........ *H04L 9/3236* (2013.01); *G06F 21/6245* (2013.01); *G06Q 20/02* (2013.01); *G06Q 20/065* (2013.01); *G06Q 20/382* (2013.01); *H04L 9/088* (2013.01); *H04L 9/0825* (2013.01); *H04L 9/3271* (2013.01); *H04L 63/0428* (2013.01);
(Continued)

(58) Field of Classification Search
USPC .......................................................... 726/26
See application file for complete search history.

(56) References Cited

U.S. PATENT DOCUMENTS 10,211,977 B1 *  2/2019  Roth .......................... H04L 9/08
2013/0138706 A1 *  5/2013  Dhuse .................... H04L 9/0825
                                                        707/827
(Continued)

FOREIGN PATENT DOCUMENTS

WO    WO 2014147085 A2    9/2014

*Primary Examiner* — Wasika Nipa
*Assistant Examiner* — Samuel Ambaye
(74) *Attorney, Agent, or Firm* — Leydig, Voit & Mayer, Ltd.

(57) ABSTRACT

A method for storing an object on storage nodes includes encrypting an object to be stored with a key. One or more hash values are computed for the object. The encrypted object is stored on the storage nodes. Storage location data is provided for the stored object. A transaction is computed for a blockchain, wherein information is encoded in the transaction, the encoded information representing the storage location data, the computed o hash values and key data. The transaction is stored in the blockchain provided by one or more blockchain nodes hosting the blockchain. A number of confirmations is provided for the transaction. The number of confirmations is compared with a predefined threshold confirmation number, wherein the predefined threshold confirmation number is computed such that with a pregiven certainty the encoded information in the transaction stored in the blockchain cannot be modified.

5 Claims, 3 Drawing Sheets

(51) Int. Cl.
*H04L 9/32* (2006.01)
*G06F 21/62* (2013.01)
*H04L 9/08* (2006.01)
*H04L 29/06* (2006.01)
*G06Q 20/06* (2012.01)
*G06Q 20/02* (2012.01)
*G06Q 20/38* (2012.01)
*G06F 21/60* (2013.01)
*H04L 9/06* (2006.01)

(52) U.S. Cl.
CPC ............ *H04L 63/12* (2013.01); *G06F 21/602* (2013.01); *H04L 9/0637* (2013.01)

(56) References Cited

U.S. PATENT DOCUMENTS

| | | | |
|---|---|---|---|
| 2015/0006895 A1* | 1/2015 | Irvine | G06F 21/6254 713/171 |
| 2016/0342994 A1* | 11/2016 | Davis | G06Q 20/382 |
| 2017/0017955 A1* | 1/2017 | Stern | H04W 4/02 |

\* cited by examiner

METHOD FOR STORING AN OBJECT ON A PLURALITY OF STORAGE NODES

CROSS-REFERENCE TO PRIOR APPLICATIONS

This application is a U.S. National Stage Application under 35 U.S.C. § 371 of International application Ser. No. PCT/EP2015/070206 filed on Sep. 4, 2015. The International Application was published in English on Mar. 9, 2017 as WO 2017/036546 A1 under PCT Article 21(2).

FIELD

The present invention relates to a method for storing an object on a plurality of storage nodes, said method performed in a memory available to one or more computing entities.

The present invention further relates to a method for retrieving a stored object.

The present invention further relates to a system for storing an object comprising a plurality of storage nodes for storing said object, one or more blockchain nodes for hosting a blockchain for transactions and one or more user clients connected to said storage nodes and said blockchain nodes.

Even further the present invention relates to a non-transitory computer readable medium storing a program causing a computer to execute a method for storing an object on a plurality of storing nodes.

Even further the present invention relates to a method, performed on a client, for storing an object on a plurality of storage nodes.

Even further the present invention relates to a non-transitory computer readable medium storing a program causing a computer to execute, on a client, a method for storing an object in an object on a plurality of storage nodes.

Although applicable in general to any kind of secure distributed consensus protocol enabling storing of information being replicated across a plurality of nodes, the present invention will be described with regard to blockchain as secure distributed consensus protocol.

BACKGROUND

Due to the increasing complexity of data-serving systems nowadays and an increased criticality of stored data Byzantine-fault tolerance was established as an alternative to crash-fault tolerance since a large spectrum of issues including simple outages, software bucks, misconfigurations and even intrusions can be grouped together under the term "arbitrary failure" respectively "Byzantine failure".

For example to implement a robust replicated data store, i.e. guaranteeing correctness under arbitrary failures, in the presence of asynchrony, concurrency and failures, quorum based replication is used. In the non-patent literature of Jean-Philippe Martin, Lorenzo Alvisi, Michael Dahlin "Minimal Byzantine Storage, DISC 2002: 311-325", it is shown that 3f+1 servers have to be used for Byzantine-fault tolerance off arbitrary failures. To read a correct value, a quorum Qr, i.e. a set of servers Qr, queried by a read operation needs to intersect a quorum Qw updated by a write operation in f+1 servers. That could guarantee that there is at least one correct server in the intersection, since at most f may be fail Byzantine. This translates to the following requirement:

1) $|Qr|+|Qw|-n>=f+1$, wherein $n$ is the total number of servers to be used.

Furthermore, to avoid indefinitely waiting for crashed servers during a read or a write operation the quorums of servers, Qr and Qw can comprise of at most n-f servers. Since at most f servers may be faulty, n-f servers are guaranteed to eventually reply. This translates to the following requirement:

2) $|Qr|=|Qw|<=n-f$

By combining the two requirements 1) and 2) this leads to:

$$2n-2f-n>=f+1=>n>=3f+1.$$

Therefore conventional systems use 3f+1 servers on Byzantine fault-tolerant storage.

For example, in the non-patent literature of Alysson Neves Bessani, Miguel P. Correia, Bruno Quaresma, Fernando André, Paulo Sousa: DepSky "Dependable and secure storage in a cloud-of-clouds", EuroSys 2011: 31-46, 3f+1 servers or clouds are used to tolerate the failure up to f servers using Byzantine quorum-based data replication.

In the further non-patent literature of Miguel Castro, Barbara Liskov "Practical byzantine fault tolerance and proactive recovery", ACM Trans. Comput. Syst. 20(4): 398-461 (2002) and Dahlia Malkhi, Michael K. Reiter "Byzantine Quorum Systems", Distributed Computing 11(4): 203-213 (1998) other conventional Byzantine fault tolerance systems are shown.

Since tolerating Byzantine faults requires f servers more than needed to tolerate only crash failures, one of the problems of byzantine quorum-based data replication are the additional costs compared to crash tolerant systems. For example as shown in the non-patent literature of Rui Fan, Nancy A. Lynch "Efficient Replication of Large Data Objects", DISC 2003: 75-91, 2f+1 servers are used to tolerate f crashes, yet no byzantine faults can be tolerated.

Thus, Byzantine-fault tolerance protocols are still complicated and costly to implement. As already mentioned conventional Byzantine-fault tolerance storage system require 3f+1 servers in order to tolerate any f Byzantine nodes to ensure full consistency and is often required that readers contact multiple servers at a time in order to retrieve the most updated version of an object as for example as disclosed in the non-patent literature of Elli Androulaki, Christian Cachin, Dan Dobre, Marko Vukolic, "Erasure-Coded Byzantine Storage with Separate Metadata", in Proceedings of OPODIS 2014 and in the non-patent literature of Dan Dobre, Ghassan Karame, Wenting Li, Matthias Majuntke, Neeraj Suri, Marko Vukolic "PoWerStore: Proofs of Writing for Efficient and Robust Storage", in Proceedings of the ACM Conference on Computer and Communications Security (CCS), Berlin, Germany, 2013.

SUMMARY

In an embodiment, the present invention provides a method for storing an object on a plurality of storage nodes that is performed in a memory available to one or more computing entities. In a step a), an object to be stored is encrypted with a key. In a step b), one or more hash values are computed for the object to be stored. In a step c), the encrypted object is stored on the plurality of storage nodes. In a step d), storage location data is provided for the stored object. In a step e), a transaction is computed for a blockchain, wherein information is encoded in the transaction, the encoded information representing the storage location data, the computed one or more hash values and key data. In a step f), the transaction is stored in the blockchain provided by one or more blockchain nodes hosting the blockchain. In a step g), a number of confirmations is provided for the transaction stored in the blockchain by the blockchain nodes. In a step h), the number of confirmations is compared with a predefined threshold confirmation number, wherein the predefined threshold confirmation number is computed such that with a pregiven certainty the encoded information in the transaction stored in the blockchain cannot be modified.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Improvements provided by embodiments of the invention include providing a Byzantine-fault tolerance storage system with minimum costs and maximum efficiency.

In an embodiment the present invention provides a method for storing an object on a plurality of storage nodes, said method performed in a memory available to one or more computing entities, said method comprising the steps of a) Encrypting an object to be stored with a key,
b) Computing one or more hash values for said object to be stored,
c) Storing said encrypted object on a plurality of said storage nodes,
d) Providing storage location data for said stored object,
e) Computing a transaction for a blockchain, wherein information is encoded in said transaction, said encoded information representing storage location data, said computed one or more hash values and key data,
f) Storing said transaction in a blockchain provided by one or more blockchain nodes hosting said blockchain,
g) Providing a number of confirmations for said transaction stored in said blockchain by said blockchain nodes,
h) Comparing said number of confirmations with a predefined threshold confirmation number, wherein said predefined threshold confirmation number is computed such, that with a pregiven certainty the encoded information in said transaction stored in the blockchain cannot be modified.

Said method may be performed in a memory available to one or more computing devices.

In a further embodiment the present invention provides a method for retrieving an object stored, comprising the steps of:

A) Searching for all transactions issued by a user in the blockchain,
B) Parsing found transactions to obtain the encoded information for said object,
C) Decrypting key data of the obtained encoded information,
D) Computing a decryption key based on the decrypted key generation data,
E) Retrieving the object from a storage node, and
F) Comparing a hash value of the retrieved object with the hash value computed during storage of the object and upon matching determining that the stored object has not be altered.

In a further embodiment the present invention provides a system for storing an object comprising a plurality of storage nodes for storing said object, one or more blockchain nodes for hosting a blockchain for transactions and one or more user clients connected to said storage nodes and said blockchain nodes, wherein
the client is adapted
to encrypt an object to be stored with a key,
to compute one or more hash values for said object to be stored,
to initiate storing said encrypted object on a plurality of said storage nodes,
to compute a transaction for a blockchain, wherein information is encoded in said transaction, said encoded information representing storage location data, said computed one or more hash values and key data, and
to initiate storing said transaction in a blockchain provided by one or more blockchain nodes hosting said blockchain
to compare a received number of confirmations with a predefined threshold confirmation number, wherein said predefined threshold confirmation wherein said predefined threshold confirmation number is computed such, that with a pregiven certainty the encoded information ins said transaction and stored in the blockchain cannot be modified,
said storage nodes being adapted
to provide storage location data for said stored object,
said blockchain nodes being adapted
to store said transaction in a blockchain, provided by one or more blockchain nodes hosting said blockchain
to provide a number of confirmations for said transaction by said blockchain.

In a further embodiment the present invention provides a non-transitory computer readable medium storing a program causing a computer to execute a method for storing an object on a plurality of storage nodes,
said method comprising the steps of
a) Encrypting an object to be stored with a key,
b) Computing one or more hash values for said object to be stored,
c) Storing said encrypted object on a plurality of said storage nodes,
d) Providing storage location data for said stored object,
e) Computing a transaction for a blockchain, wherein information is encoded in said transaction, said encoded information representing storage location data, said computed one or more hash values and key data,
f) Storing said transaction in a blockchain provided by one or more blockchain nodes hosting said blockchain,
g) Providing a number of confirmations for said transaction stored in said blockchain by said blockchain,
h) Comparing said number of confirmations with a predefined threshold
confirmation number, wherein said predefined threshold confirmation number is computed such, that with a pregiven certainty the encoded information in said transaction stored in the blockchain cannot be modified.

In a further embodiment the present invention provides a method, performed on a client, for storing an object on a plurality of storage nodes,
said method performed in a memory available to said client, said method comprising the steps of
1) Encrypting an object to be stored with a key,
2) Computing one or more hash values for said object to be stored,
3) Initiating storing said encrypted object on a plurality of said storage nodes,
4) Receiving storage location data for said stored object,
5) Computing a transaction for a blockchain, wherein information is encoded in said transaction, said encoded information representing storage location data, said computed one or more hash values and key data,
6) Initiating storing said transaction in a blockchain provided by one or more blockchain nodes hosting said blockchain,
7) Receiving a number of confirmations for said transaction,
8) Comparing said number of confirmations with a predefined threshold
confirmation number, wherein said predefined threshold confirmation number is computed such, that with a pregiven certainty the encoded information in said transaction and stored in the blockchain cannot be modified.

In a further embodiment the present invention provides a non-transitory computer readable medium storing a program causing a computer to execute on a client a method for storing an object on a plurality of storage nodes, said method comprising the steps of
1) Encrypting an object to be stored with a key,
2) Computing one or more hash values for said object to be stored,
3) Initiating storing said encrypted object on a plurality of said storage nodes,
4) Receiving storage location data for said stored object,
5) Computing a transaction for a blockchain, wherein information is encoded in said transaction, said encoded information representing storage location data, said computed one or more hash values and key data,
6) Initiating storing said transaction in a blockchain provided by one or more blockchain nodes hosting said blockchain,
7) Receiving a number of confirmations for said transaction,
8) Comparing said number of confirmations with a predefined threshold confirmation number, wherein said predefined threshold confirmation number is computed such, that with a pregiven certainty the encoded information in said transaction and stored in the blockchain cannot be modified.

At least one embodiment has the advantage that a robust and provably authenticated storage system and method is provided. Further at least one embodiment of the present invention has the advantage that no metadata node is required and the storage system can resist up to n-1 Byzantine storage nodes out of n storage nodes. At least one embodiment has the advantage of enhancing the performance compared to conventional Byzantine fault tolerant storage systems. At least one embodiment has the advantage of requiring a smaller number of storage nodes and metadata nodes.

The term "object" is to be understood, in particular in the claims, preferably in the description as any kind of information or data.

The term "blockchain" is to be understood, in particular in the claims, preferably in the description as a distributed database maintaining a continuously growing list of data records that are hardened against tampering and revision even by operators of the data storing nodes hosting database. A blockchain comprises for example two kinds of records: so-called transactions and so-called blocks. Transactions may be the actual data to be stored in the blockchain and blocks may be records confirming when and in what sequence certain transactions became journaled as a part of the blockchain database. Transactions may be created by participants and blocks may be created by users who may use specialized software or equipment designed specifically to create blocks. The term "blockchain" is e.g. identical to the Bitcoin blockchain as a digital currency was introduced in 2008 and has meanwhile more adoption and attention than any other digital currency up to date. Currently Bitcoin is integrated across several businesses and has several exchange markets.

In the last couple of years research concerning Bitcoin was focused on the provisions of Bitcoin as digital currency as disclosed in the non-patent literature of Ghassan Karame, Elli Androulaki, Srdjan Capkun, "Double-Spending Attacks on Fast Payments in Bitcoin", in Proceedings of the ACM Conference on Computer and Communications Security (CCS), Chicago, Ill., USA, 2012.

Bitcoin is based on the so-called blockchain. This blockchain provides a distributed consensus scheme enabling transactions and any other data to be securely stored and verified without any centralized authority. A number of applications have already been published. For instant recent studies have shown that blockchain enables the construction of a time-dependent public randomness beacon as disclosed in the non-patent literate of F. Armknecht, J. Bohli, G. O. Karame, Z. Liu, and C. A. Reuter, "Outsourced proofs of retrievability", in Proceedings of the 2014 ACM SIGSAC Conference on Computer and Communications Security, Scottsdale, Ariz., USA, Nov. 3-7, 2014, pages 831-843, 2014, outputting 64 bits of minimal entropy every 10 minutes as disclosed in the non-patent literature of Bitcoin as a public source of randomness,
https://docs.google.com/presentation/d/
1VWHm4Moza2znhXSOJ8FacfNK2B_vxnfbdZgC5
EpeXFE/view?pli=1#slide=id.g3934beb89_034, 2014.

In Bitcoin uses execute payments by digitally signing the transactions and are prevented from double-spending their coins, i.e. signing-over the same coin to different users, through a distributed time-stamping service. This service operates on top of the Bitcoin peer-to-peer network ensuring that all transactions and their order of execution are available to all Bitcoin users.

Transactions are basically formed by digitally signing a hash of the previous transaction, where this coin was last spent along with a public key of the future owner and incorporating this signature in the coin as disclosed in the non-patent literature of Ghassan Karame, Elli Androulaki, Srdjan Capkun, "Double-Spending Attacks on Fast Payments in Bitcoin", in Proceedings of the ACM Conference on Computer and Communications Security (CCS), Chicago, Ill., USA, 2012.

Any peer can verify the authenticity of a Bitcoin by checking the chain of signatures. Transactions may optionally include a text field which can be used to a text to transactions. Alternatively text can be added in form of invalid public keys. That means instead of specifying a valid public key, one can encode text and include the encoded text in this field. Bitcoin enables multi-output transactions and multi-signature transactions, thus enabling large text fields in place of multiple public keys.

The term "node" is to be understood in its broadest sense, preferably in the claims, in particular in the description and indicates any kind of computing device or computing entity, computer or the like.

The term "storage location data" is to be understood in its broadest sense, and refers in particular in the claims, preferably in the description to any kind of information or data which enables to find the location(s) of a stored object on a node, server or the like.

The term "key data" is to be understood in its broadest sense and refers in particular in the claims, preferably in the description to any kind of data which comprises information of, about or being related to encryption and/or decryption keys, master secrets, master secret keys or the like.

The term "confirmation" refers in particular in the claims, preferably in the description to any kind of data or information, indicating acknowledging or confirming correct storage, e.g. in the blockchain.

The term "threshold number" is to be understood as a natural number including zero.

The term "computing device" or "computing entity", etc. refers in particular in the claims, preferably in the description to a device adapted to perform computing like a personal computer, a tablet, a mobile phone, a server, or the like and may comprise one or more processors having one or more cores and may be connectable to a memory for storing an application which is adapted to perform corresponding steps of one or more of the embodiments of the present invention. Any application may be software based and/or hardware based installed in the memory on which the processor(s) can work on. The computing devices or computing entities may be adapted in such a way that the corresponding steps to be computed are performed in an optimized way. For instance different steps may be performed in parallel with a single processor on different of its cores.

The term "computer readable medium" may refer to any kind of medium, which can be used together with a computation device or computer and on which information can be stored. Said information may be any kind of data e.g. instructions, commands or the like which can be read into a memory of a computer and may be executed by said computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM, EEPROM or the like.

Further features, advantages and further embodiments are described or may become apparent in the following:

The key for encryption may be generated and based on a precomputed master secret. A master secret enables for example in an easy way to construct a decryption key.

Encryption of step a) may be performed semantically secure. This enhances the security since an attacker can not draw conclusions about the contents of a ciphertext except the length of the ciphertext.

Key data may include said precomputed master secret and/or the encryption key itself, wherein said key data may be secured with a passphrase. This enables an efficient construction of a decryption and a later download of the stored object.

An information dispersal algorithm may be used on the encrypted object to be stored resulting in a first number of chunks such that the encrypted object can be reconstructed from a second number of chunks, said second number being smaller than said first number, wherein in step c) the hash values for the first number of chunks is computed and subsequently used for steps d)-h). This enables an erasure-coded storage: A user then may erasure code the encrypted object by using said informational dispersal algorithm so that any m chunks out of the n erasure coded chunks are enough to construct the encrypted object. The user then may compute the individual hashes of each chunk. After storing the m chunks on n storage servers the user may then store the following information in the blockchain: E(S) II G1, . . . , Pn II H1, . . . , Hn wherein P1, . . . ,Pn indicate pointers, pointing to the location of the encrypted object and E(S) denotes an encrypted master secret. This provides security even when n-m storage nodes are arbitrarily Byzantine and when a large fraction, for example of Bitcoin nodes is arbitrarily Byzantine. A user can also directly detect said Byzantine storage nodes.

A public/private key pair may be provided for a user of a plurality of users, wherein each public key maps to a Bitcoin address and wherein a master key which is used for encryption or an object, is preshared among said plurality of users. This enables an authenticated storage: Authenticated storage refers to a storage system where each entity can prove to another that it has stored a given object. Applications for such authenticated storage are for example court documents, which need to be proven that they are stored by a given entity, any modifications to legal documents, etc. In detail: To provide said authenticated storage the plurality of users each having a public/private key pair. Each public key maps to a Bitcoin address. Whenever a user wants to commit a change to a given document then the user may perform the following steps, under the assumption that all these users have preshared a master key K1. Prior to storing a version change of object O on the servers, a user encrypts the object O with the preshared master key K1 Enc(K1, O) denoting a semantic secure encryption of object O under key K1. The user then proceeds to store object O according to steps a)-h) since users are authenticated—each user is authenticated with each transaction he makes users can prove to others that they preformed a given modification to a given object like a document, etc.

Said encryption key and/or master secret used for generating the encryption key may be encrypted and stored in said blockchain. This provides a perpetual storage for encryption keys: The blockchain is used as inherent storage for keys since they are small in size and they will be stored and replicated usually across millions of blockchain nodes. This has the advantage that keys are unlikely to be lost and due to the blockchain inherent features these keys can never be modified.

The object to be stored may be a group encryption key defined for a group of users. This allows to provide a public bulletin board: A group key can be derived by a plurality of users using the blockchain as committed and authenticated communication medium.

The method for retrieving an object may comprise the step G) of upon matching, decrypting the retrieved object using the computed decryption key. This enables to provide the object in clear text when certainty is given, that the object has not been modified.

The storage node in step E) may be selected randomly. This enables in an easy and efficient way to download the object from one of the storage nodes.

Figure 1:
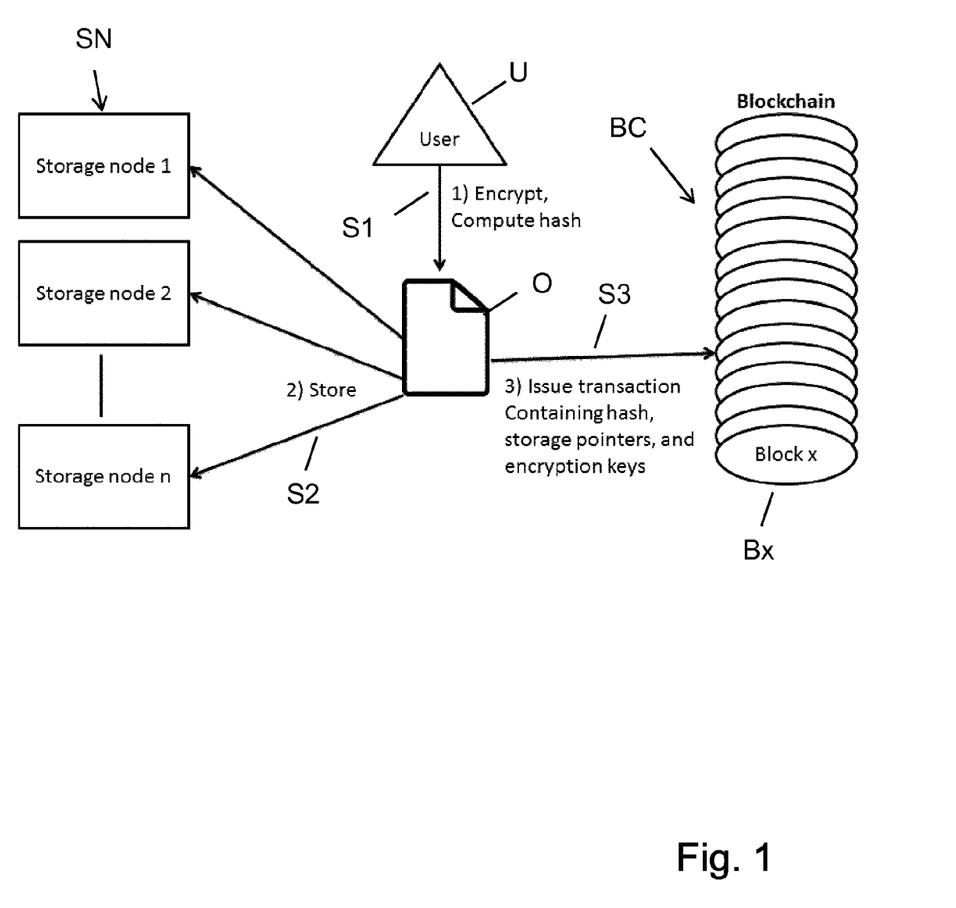
FIG. 1 shows steps at a method according to an embodiment of the present invention.

FIG. 1 shows steps of a method according to an embodiment of the present invention.

In FIG. 1 some steps for providing a dependable and robust storage is shown where a user performs in detail the following steps, assuming n storage nodes SN, for example cloud servers, out of which n-1 storage nodes SN can be arbitrarily Byzantine.

1. Prior to storing the object O on the storage nodes SN, the user U computes a master secret S, and a key K=H(S||"Encryption key").
2. The user then computes Enc(K,O), which denotes the semantic secure encryption of object O under key K.
3. The user U then stores the encrypted object Enc(K,O) redundantly on the n storage nodes SN and acquires n pointers P1, . . . Pn which point to the location of the encrypted object on each of the n storage nodes, respectively.
4. The user encrypts master secret S using a passphrase of this choice. The resulting encryption is denoted as E(S). The user U then encodes the following information in a transaction to be confirmed in the blockchain: E(S) ||P1 . . . Pn||(Enc(K,O)), where H(.) is a hash function.
5. Once the transaction acquires enough confirmation in the blockchain (e.g. six confirmations are enough), the user U is certain that the metadata information i.e. the encoded information in the blockchain can never be modified by any entity.
6. To retrieve the information, the user's client searches for all transactions issued by the user U in the blockchain and parses the transactions in order to acquire E(S) ||P1 . . . Pn|| H(Enc(K,O)).
7. The user U decrypts S, constructs K, and downloads O from a storage node SN location e.g. picked at random. If the hash of the downloaded object matches H(Enc(K,O)), then the file has not been modified.
8. The user U then decrypts the file using K.

To summarize: In a first step S1 a user U encrypts the object O and computes a corresponding hash value. In a second step S2 the encrypted object is stored on the storage nodes SN and a transaction is issued in a third step S3 comprising a hash, storage pointers and encryption keys wherein said transaction is transmitted to the blockchain BC for confirmation.

Authentication is not needed here but is implicit since nobody can issue a transaction on behalf of the user due to the underlying structure: For example in Bitcoin the issue of a transaction is the only entity who can sign the ownership of a given coin.

The method shown is secure even if n-1 storage nodes N are arbitrarily Byzantine and when a large fraction of blockchain nodes, for example Bitcoin nodes is arbitrarily Byzantine as well as for example disclosed in the non-patent literature of Arthur Gervais, Hubert Ritzdorf, Ghassan O. Karame, HYPERLINK "http://dblp.uni-trier.de/pers/hd/c/Capkun:Srdjan" Srdjan Capkun, IACR Cryptology ePrint Archive 2015: 578 (2015). The user can directly detect Byzantine storage SN.

In another embodiment erasure coded storage is provided, the method for storage is very similar to the aforementioned method with the following differences:

The user erasure-codes Enc(K,O) using an information dispersal algorithm (IDA) so that any m chunks out of the n erasure codes are enough to construct O. The user computes the individual hash of each chunk H1, . . . , Hn. After storing the chunks on the n storage servers, the user then stores the following information in the blockchain:

E(S) ||P1 . . . Pn||H1 . . . Hn

This scheme is secure even when n-m storage nodes are arbitrarily Byzantine, and when a large fraction of Bitcoin nodes is arbitrarily Byzantine as disclosed in the non-patent literature of Arthur Gervais, Hubert Ritzdorf, Ghassan O. Karame, Srdjan Capkun, IACR Cryptology ePrint Archive 2015: 578 (2015). The user can directly detect Byzantine storage nodes.

In another embodiment, aforementioned robust storage can be adapted to provide an authenticated storage. Authenticated storage refers to a storage system where each entity can prove to another that it had stored a given object. Typical examples are court documents which for example need to be proven that they are stored by a given entity, any modifications to legal documents, etc.

To construct an authenticated storage, a setting comprising of m users is assumed, each having a public/private key pair. Each public key maps to a Bitcoin address. Whenever the user wants to commit a change to a given document, then the user performs the following operations assuming that all these users pre-share a master key K1.

Prior to storing version change O on the servers, the user computes Enc(K1, O), which denotes the semantic secure encryption of object O under key K1. The user then proceeds to store O using the methods described in the aforementioned embodiment.

Since users are authenticated (each user is authenticated with each transaction he makes), users can prove to others that they performed a given modification to a given document.

In a further embodiment a perpetual storage for encryption keys can be provided using the blockchain providing effective means to securely store encryption keys. Techniques range from hardware tokens to paper QR keys, to trusted computing, applications specific to storing keys, etc.

An inherent storage for keys using said blockchain is enabled since they are small in size and they will be stored replicated across millions of nodes. That is, these keys are unlikely to be lost. Moreover, due to the blockchain nature, these keys can never be modified.

As described above, encryption keys can be encrypted with a passphrase and stored in the blockchain in encrypted form. Alternatively, only a master key can be stored and encrypted in the blockchain and the remaining keys can be derived from the master key.

In a further embodiment a public bulletin board is provided. A group key can be derived by n users by leveraging the blockchain as a committed and authenticated communication medium.

In a further embodiment the present invention provides a method comprising the steps of
1. Encrypting object with a key and storing the encrypted object on storage nodes.
2. Computing the encrypted object hash, and the storage pointers, and encrypting the encryption key with a passphrase.
3. Issuing a transaction where the outputs and/or the multi-sig fields encode the hash, URI pointers and encrypted key.
4. Waiting till the issued transaction is confirmed and permanently stored in the blockchain.
5. To retrieve the object, the user first fetches the issued transaction (by searching over the issuer's address field), acquires the storage pointers, then uses those to fetch the object from the storage node, then checks the object hash, and if the verification passes, the user decrypts the object using the key.

Figure 2:
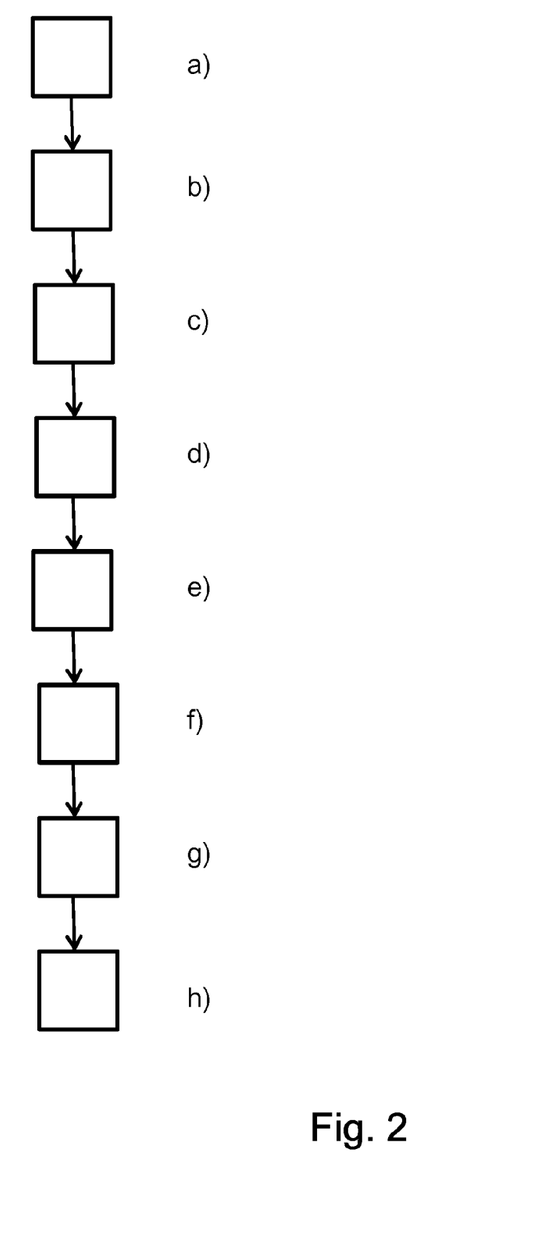
FIG. 2 shows a step of a method according to a further embodiment the present invention.

FIG. 2 shows steps of a method according to a further embodiment of the present invention.

In FIG. 2 steps of a method for storing an object on a plurality of storage nodes are shown
said method performed in a memory available to one or more computing entities,
said method comprising the steps of
a) Encrypting an object to be stored with a key,
b) Computing one or more hash values for said object to be stored,
c) Storing said encrypted object on a plurality of said storage nodes,
d) Providing storage location data for said stored object,
e) Computing a transaction for a blockchain, wherein information is encoded in said transaction, said encoded information representing storage location data, said computed one or more hash values and key data,
f) Storing said transaction in a blockchain provided by one or more blockchain nodes hosting said blockchain,
g) Providing a number of confirmations for said transaction by said blockchain,
h) Comparing said number of confirmations with a predefined threshold confirmation number, wherein said predefined threshold confirmation number is computed such, that with a pregiven certainty the encoded information in said transaction and stored in the blockchain cannot be modified.

Figure 3:
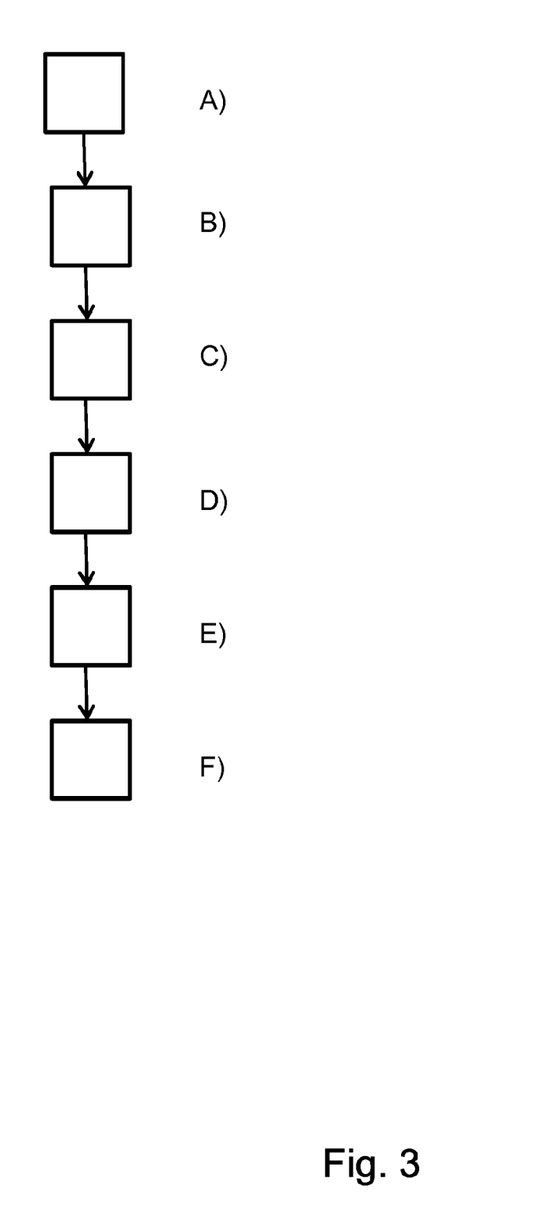
FIG. 3 shows a step of a method according to a further embodiment of the present invention.

FIG. 3 shows steps of a method according to a further embodiment of the present invention.

In FIG. 3 steps of a method for retrieving an object stored according to an embodiment of the present invention, comprising the steps of
A) searching for all transactions issued by a user in the blockchain,
B) parsing found transactions to obtain the encoded information for said object,
C) Decrypting key generation data,
D) Computing a decryption key based on the decrypted key generation data,
E) Retrieving the object from a storage node, and
F) Comparing the hash value of the retrieved object with the hash value computed during storage of the object and upon matching determining that the stored object has not been altered.

The present invention enables storing of metadata in unused transaction outputs and/or unused signature fields in the blockchain in order to
construct a durable reliable robust and Byzantine resilient storage,
an authenticated storage system, wherein each entity can prove that it committed changes in a document and wherein the order and timestamp of the changes can be securely kept and recorded in spite of malicious entities, and
an efficient perpetual storage for encryption keys.

Embodiments of the present invention may have the advantage of providing a robust and provably authenticated storage system not requiring any metadata node and further which can resist up to n-1 Byzantine storage nodes. Embodiments of the present invention further may have the advantage of considerably enhancing the performance compared to conventional Byzantine fault tolerance storage systems or methods requiring considerably the smaller number of storage and metadata nodes.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for storing an object on, and retrieving the object from, a plurality of storage nodes, the method being performed in a memory available to one or more computing entities, the method comprising:
 a) encrypting an object to be stored with a key,
 b) computing one or more hash values for the object to be stored,
 c) storing the encrypted object on the plurality of storage nodes,
 d) providing storage location data for the stored object,
 e) computing a transaction for a blockchain, wherein information is encoded in the transaction, the encoded information representing the storage location data, the computed one or more hash values and key data,
 f) storing the transaction in the blockchain provided by one or more blockchain nodes hosting the blockchain,
 g) providing a number of confirmations for the transaction stored in the blockchain by the blockchain nodes, and
 h) comparing the number of confirmations with a predefined threshold confirmation number, wherein the predefined threshold confirmation number is computed such that with a pregiven certainty the encoded information in the transaction stored in the blockchain cannot be modified;
wherein the method further comprises:
 A) searching for all transactions issued by a user in the blockchain,
 B) parsing found transactions to obtain the encoded information for the object, C) decrypting the key data of the obtained encoded information,
D) computing a decryption key based on the decrypted key generation data,
E) retrieving the object from a storage node, and
F) comparing a hash value of the retrieved object with the hash value computed during storage of the object and, based on matching, determining that the stored object has not been altered.

2. The method according to claim 1, further comprising decrypting the retrieved object using the computed decryption key based on determining, in step F), that the stored object has not been altered.

3. The method according to claim 1, wherein the storage node in step E) is selected randomly.

4. A system for storing an object, the system comprising:
a plurality of storage nodes configured to store the object and to provide storage location data for the stored object,
one or more blockchain nodes configured to:
  host a blockchain for a transaction,
  store the transaction in the blockchain, provided by the one or more blockchain nodes hosting the blockchain, and
  provide a number of confirmations for the transaction by the blockchain, and
one or more user clients connected to the storage nodes and said the one or more blockchain nodes, each of the clients being configured to:
  encrypt an object to be stored with a key,
  compute one or more hash values for the object to be stored,
  initiate storing the encrypted object on a plurality of the storage nodes,
  compute a transaction for a blockchain, wherein information is encoded in the transaction, the encoded information representing storage location data, the computed one or more hash values and key data, wherein the key data includes at least one of: (i) a copy of the key and (ii) a copy of a master secret from which the key was derived,
  initiate storing the transaction in a blockchain provided by one or more blockchain nodes hosting the blockchain, and
  compare a received number of confirmations with a predefined threshold confirmation number, wherein the predefined threshold confirmation wherein the predefined threshold confirmation number is computed such, that with a pregiven certainty the encoded information in the transaction and stored in the blockchain cannot be modified;
wherein at least one of the user clients is configured to:
  search for transactions issued by a user in the blockchain,
  parse found transactions to obtain the encoded information for the object,
  decrypt the key data of the obtained encoded information,
  compute a decryption key based on the decrypted key generation data,
  retrieve the object from a storage node, and
  compare a hash value of the retrieved object with the hash value computed during storage of the object and, based on matching, determining that the stored object has not been altered.

5. A non-transitory computer readable medium storing a program for causing the one or more computing entities to perform a method for storing an object on, and retrieving the object from, a plurality of storage nodes, the method being performed in a memory available to one or more computing entities, the method comprising:
a) encrypting an object to be stored with a key,
b) computing one or more hash values for the object to be stored,
c) storing the encrypted object on the plurality of storage nodes,
d) providing storage location data for the stored object,
e) computing a transaction for a blockchain, wherein information is encoded in the transaction, the encoded information representing the storage location data, the computed one or more hash values and key data,
f) storing the transaction in the blockchain provided by one or more blockchain nodes hosting the blockchain,
g) providing a number of confirmations for the transaction stored in the blockchain by the blockchain nodes, and
h) comparing the number of confirmations with a predefined threshold confirmation number, wherein the predefined threshold confirmation number is computed such that with a pregiven certainty the encoded information in the transaction stored in the blockchain cannot be modified;
wherein the method further comprises:
A) searching for all transactions issued by a user in the blockchain,
B) parsing found transactions to obtain the encoded information for the object,
C) decrypting the key data of the obtained encoded information,
D) computing a decryption key based on the decrypted key generation data,
E) retrieving the object from a storage node, and
F) comparing a hash value of the retrieved object with the hash value computed during storage of the object and, based on matching, determining that the stored object has not been altered.

* * * * *